United States Patent
Primos

(10) Patent No.: US 6,527,614 B1
(45) Date of Patent: Mar. 4, 2003

(54) GAME CALL ASSEMBLY SYSTEM AND METHOD

(75) Inventor: Wilbur R. Primos, Madison, MS (US)

(73) Assignee: Primos, Inc., Flora, MS (US)

( * ) Notice: Subject to any disclaimer, the term of this patent is extended or adjusted under 35 U.S.C. 154(b) by 0 days.

(21) Appl. No.: 10/159,335

(22) Filed: May 31, 2002

(51) Int. Cl.$^7$ .............................................. A63H 5/00
(52) U.S. Cl. ..................................... 446/207; 446/208
(58) Field of Search ............................... 446/202–203, 446/204–207, 416, 408, 208; 84/402, 408, 409–410, 386, 330, 383; 43/2, 3

(56) References Cited

U.S. PATENT DOCUMENTS

| | | | | |
|---|---|---|---|---|
| 2,544,370 A | * | 3/1951 | Walther | |
| 3,066,444 A | * | 12/1962 | Dieckmann | |
| 4,143,485 A | * | 3/1979 | Stewart | 46/180 |
| 4,915,660 A | * | 4/1990 | Overholt, Sr. | 446/207 |
| 4,940,451 A | * | 7/1990 | Leady | 446/208 |
| 5,975,978 A | * | 11/1999 | Hall | 446/208 |
| 6,234,859 B1 | * | 5/2001 | Primos et al. | 446/207 |
| 6,234,860 B1 | * | 5/2001 | Cook | 446/208 |
| 6,435,933 B1 | * | 8/2002 | Browne | 446/207 |

* cited by examiner

Primary Examiner—Derris H. Banks
Assistant Examiner—Jamila Williams
(74) Attorney, Agent, or Firm—Holland & Hart

(57) ABSTRACT

A game call assembly system and method includes a game call apparatus which has a reed assembly, a stopper, and a barrel. The reed assembly includes a sounding board, a reed, and a wedge which are inserted as a unit into an end of the stopper. A rotation restrictor in the form of a keyway is interposed between the reed assembly and the stopper to restrict relative rotational movement of the reed assembly relative to the stopper. An insertion stop is provided on the reed assembly to limit the extent to which the reed assembly is inserted into the stopper. A unique wedge allows adjustment of the wedge relative to the reed without changing the location of the reed relative to the sounding board.

23 Claims, 4 Drawing Sheets

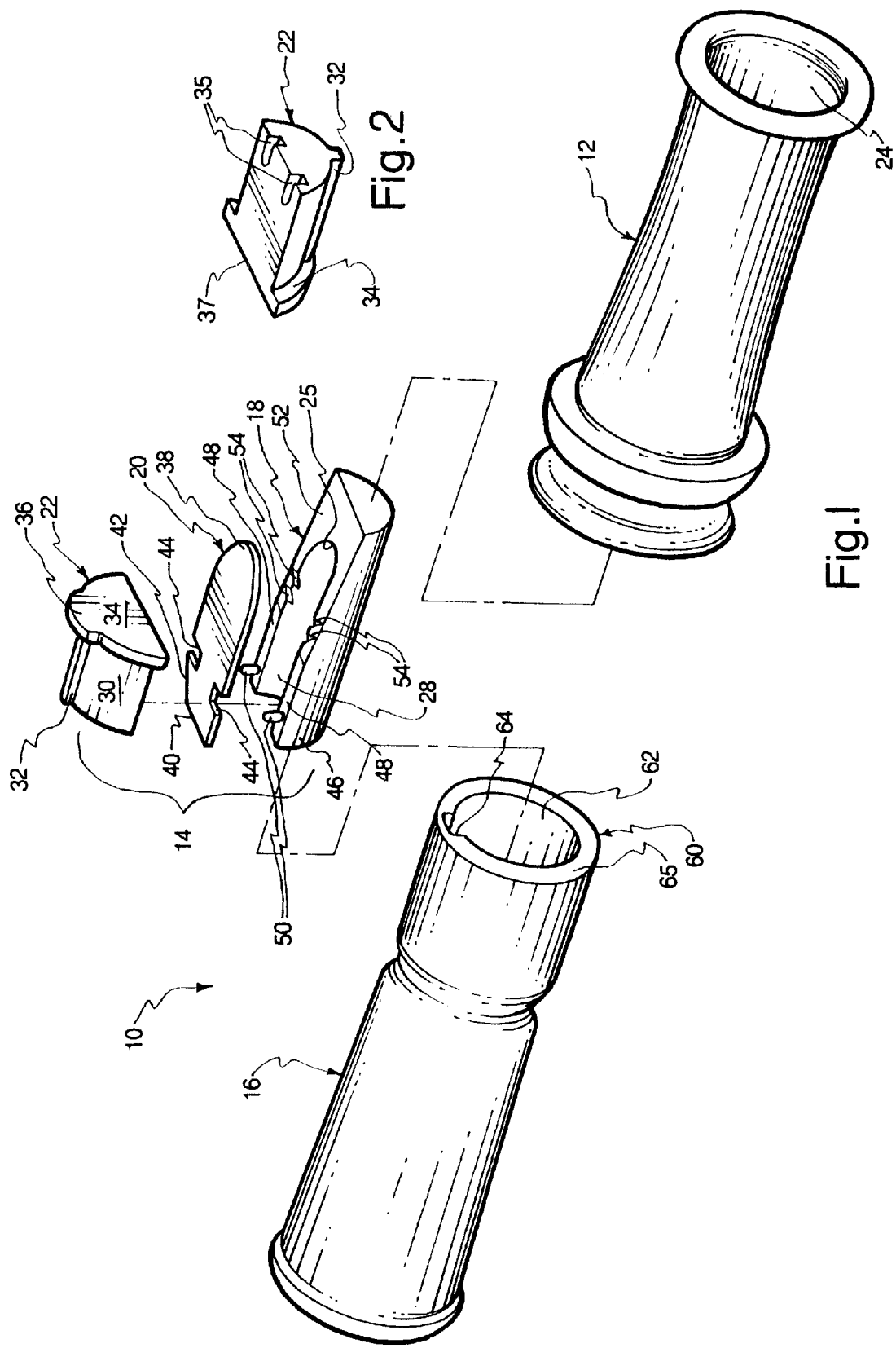

GAME CALL ASSEMBLY SYSTEM AND METHOD

FIELD OF THE INVENTION

The present invention relates to game calls, and more particularly to game call assembly systems and methods.

BACKGROUND OF THE INVENTION

Many different types of game calls have existed for many decades. One particularly popular type of game call involves a reed assembly which is secured to a bell or stopper which, in turn, is secured to a mouthpiece or barrel. Typically, the barrel is inserted over a narrow end of the stopper which surrounds the reed assembly. These types of game calls are commonly used for simulating the sounds of waterfowl, such as ducks and geese, predators, and other game.

One particular challenge with these game calls relates to their assembly. In securing the reed assembly into the small end of the stopper, the reed assembly components (i.e., the sounding board, the reed, and the reed retaining piece or wedge) are typically rotated as a unit into the cylindrical small end aperture formed in the stopper. This rotation and insertion of the reed assembly into the stopper creates a friction fit. An increasingly tighter friction fit results as the reed assembly moves further into the stopper. This friction fit is similar to corking a bottle.

Traditional assembly methods create a number of problems. One problem relates to wear on the friction-fit surfaces. Experienced game call users will appreciate the extent to which the reed assembly must be inserted into the stopper so the correct pressure on the reed is achieved so that appropriate sounds can be generated. The tightness or "fit" between the reed assembly and the stopper affects the pressure applied by the wedge on the reed. The sounds of the call are affected by changing this pressure. Sounds created by the game call can be negatively affected by too much or too little pressure applied by the wedge to the reed. Too much pressure may score or otherwise damage the reed, and could elevate the distal end of the reed relative to the sounding board, which would completely change the sounds made by the game call. Too little pressure, on the other hand, may allow the portion of the reed under the wedge to vibrate, which may also present problems in achieving desired sounds. Generally speaking, novices lack sufficient experience to "feel" when the correct amount of pressure of the wedge on the reed has been achieved.

Another problem relating to proper pressure is that over time, the friction fit between the reed assembly and the small diameter opening of the stopper changes because of wear resulting from the relative rotation of the reed assembly and the stopper. Generally speaking, rotational movement (i.e., any rotation movement up to and including rotations of 360°) of the stopper relative to the reed assembly may be utilized in assembling and disassembling traditional game calls when the game call user, for example, desires to clean or tune the call. Over time the repeated frictional rotational engagement of the stopper and reed assembly will cause significant wear in the respective game call components and, eventually, may result in the game call being very difficult to consistently achieve the right pressure on the reed so that the game call will produce appropriate sounds.

Another related problem concerns the predictability and repeatability of the degree to which the reed assembly must be inserted into the stopper. While experienced game call users may be able to develop a "feel" for the proper amount of insertion, most game call users will have a difficult time finding the right degree of insertion to produce quality game call sounds.

There is a need, therefore, to develop a reed assembly system which reduces the wear resulting from insertion of a reed assembly into the smaller end of the stopper when assembling game call devices. There is also a need to limit the rotational movement of the stopper opening relative to the reed assembly to minimize wear on the game call components and extend the life of the call. There is further a need to provide a game call assembly system which provides a repeatable and predictable way to measure the appropriate amount of the reed assembly that should be inserted into the stopper so that the game call will produce the desired sounds.

SUMMARY OF THE INVENTION

The present invention relates to a game call assembly system which utilizes a rotation restrictor to restrict (i.e., allow limited rotation) rotation of the reed assembly relative the stopper. In one embodiment, the rotation restrictor comprises a keyway which comprises a key slot or female portion formed longitudinally in the small end of the stopper and a correspondingly sized key or male portion formed longitudinally in the wedge. Once the key or male portion is inserted into the key slot or female portion, limited rotation approximately 20°) of the reed assembly relative to the stopper will be permitted. To assemble or disassemble the game call, the user will generally rotate the reed assembly relative to the stopper in a reciprocal, back-and-forth manner within this 20° range. Restricting or limiting rotational movement of the reed assembly relative to the stopper within this range will reduce wear. and extend the life of the game call apparatus.

The invention also comprises an insertion stop formed on the wedge for predictable and repeatable positioning of the reed assembly inside the stopper.

The foregoing and other features, utilities, and advantages of the invention will be apparent from the following detailed description of the invention with reference to the accompanying drawings.

BRIEF DESCRIPTION OF THE DRAWINGS

FIG. 1 is an exploded perspective view of a game call according to the present invention;

FIG. 2 is a bottom perspective view of a wedge of the game call of FIG. 1;

DETAILED DESCRIPTION OF THE INVENTION

Figure 3:
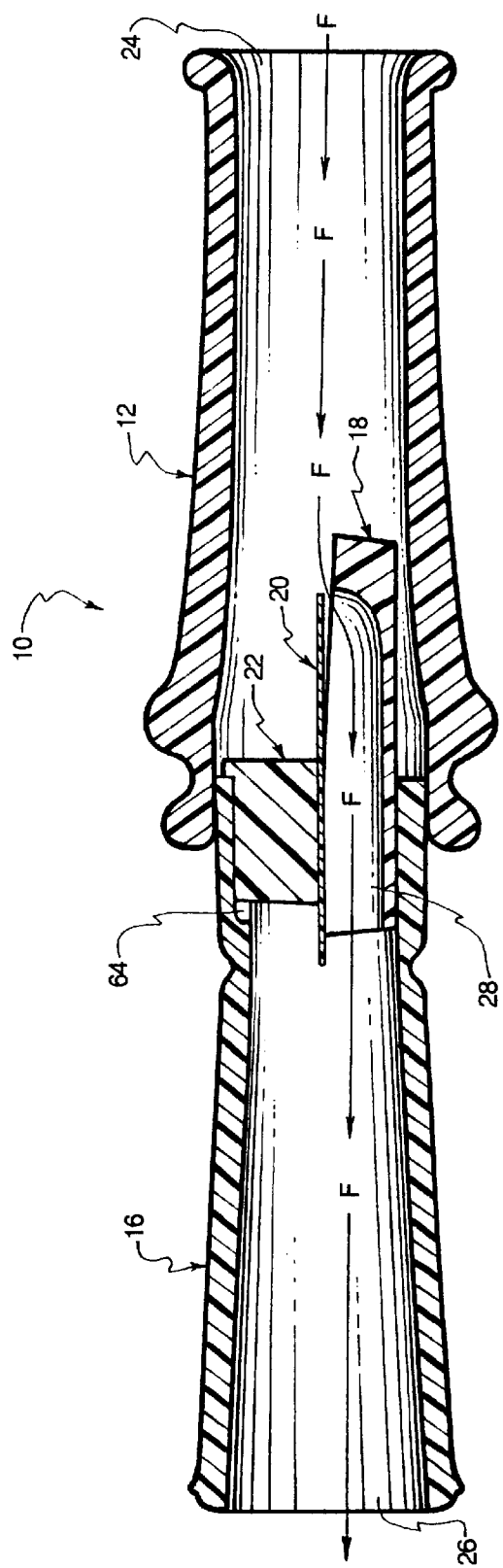
FIG. 3 is a sectional side elevation view of the game call apparatus of FIG. 1.

The present invention relates to a game call assembly system and method which involves a game call apparatus 10 comprising generally a mouthpiece or barrel 12, a reed assembly section 14, and a bell or stopper 16. The reed assembly section 14 more specifically comprises a sounding board 18, a reed 20, and a reed retaining piece or wedge 22.

As shown in FIG. 3, the assembled game call 10 defines an inlet opening 24 and an outlet opening 26. A flow of air F passes through the inlet 24 through the middle passageway of barrel 12, through a small space formed between the reed 20 and the sounding board 18, through a main air passageway 28 formed in the sounding board, through the passageway formed in the stopper 16, and through the outlet opening 26 of the stopper 16. As air flows across reed 20, it vibrates to generate sounds that simulate the sounds of wild animals. This flow of air and vibration of the sound-producing reed is common to similar traditional game calls.

As with traditional prior art game calls, the reed assembly 14 (i.e., the combined sounding board 18, reed 20, and wedge 22) is frictionally inserted into a narrow opening formed on one end of the stopper 16. Thereafter, the stopper is frictionally inserted into a relatively larger opening formed in the barrel to secure the entire game call together as a unit.

In traditional game call assembly systems, the sounding board, reed, and wedge are sandwiched together, and the unit, which forms generally a cylinder, is rotated into the small diameter end of the stopper until the reed assembly is wedged sufficiently securely into the small end of the stopper to hold the components together as a unit and produce the desired sounds for calling game animals. Where the wedge piece or retaining member exerts pressure on the reed, the "fit" or tightness with which the reed assembly is inserted into the small diameter end of the stopper will affect the pressure on the reed and, correspondingly, the sounds and tones made by the game call. Experienced game call users can sometimes learn, after considerable practice, how to "feel" the appropriate tightness between the reed assembly and the stopper so that the appropriate pressure can be applied to the reed and desired sounds can be created.

One problem with respect to traditional game call assembly methods, however, is that this continued and repeated rotation of the reed assembly relative to the stopper, which is generally unrestricted in terms of the degree of rotation, causes significant wear and changes the inside surface of the stopper and the outside surfaces of the components which comprise the reed assembly. Thus, over time, sufficient wear between these respective parts may denigrate performance of the game call to such an extent that the call, at worst, is no longer suitable to make the sounds desired by the game call user or, at best, makes it difficult for the user to guess the proper tightness that should exist between the reed assembly and the stopper so that, in turn, the proper amount of pressure is applied to the reed.

Another problem with respect to traditional game call assembly methods is that there is typically nothing to allow the user of the game call to know the extent to which the reed assembly must be inserted into the stopper for proper sounds. The more the reed assembly is inserted into the stopper, the greater the pressure exerted on the reed by the wedge. This change in pressure on the reed varies the tone and the sounds generated by the game call. Thus, commonly the trial-and-error method is used in determining the appropriate amount or length of the reed assembly which must be inserted into the stopper.

With respect to the present invention, however, as shown in FIGS. 1 and 2, the wedge 22 is uniquely configured to include a generally solid semicircular wedge body 30 and a rib or key 32 which runs longitudinally along the top surface of wedge body 30. Key 32 runs parallel to the orthogonal axis of wedge body 30. The wedge 22 further comprises an insertion stop in the form of an end wall 34 formed on one end of the wedge body 30. The wall 34 is designed to limit the extent to which the wedge 22 (and other parts of the reed assembly 14) can be inserted into the small diameter end of the stopper 16. End wall 34 further comprises an upper flange or tab 36 which is an extension of end wall 34. Flange 36 extends toward the top of wedge 22 to cover the area at the end of key 32.

Although the disclosed embodiment shows one type of wedge 22, it is to be understood that other types of wedges designed to secure the reed in place on the sounding board may be used without departing from the scope of the present invention. Further, "rotation restrictor" shall mean the keyway described herein as well as other types of structures or mechanisms interposed between the stopper and the reed assembly that restrict relative rotational movement between the reed assembly and the stopper.

Figure 5:
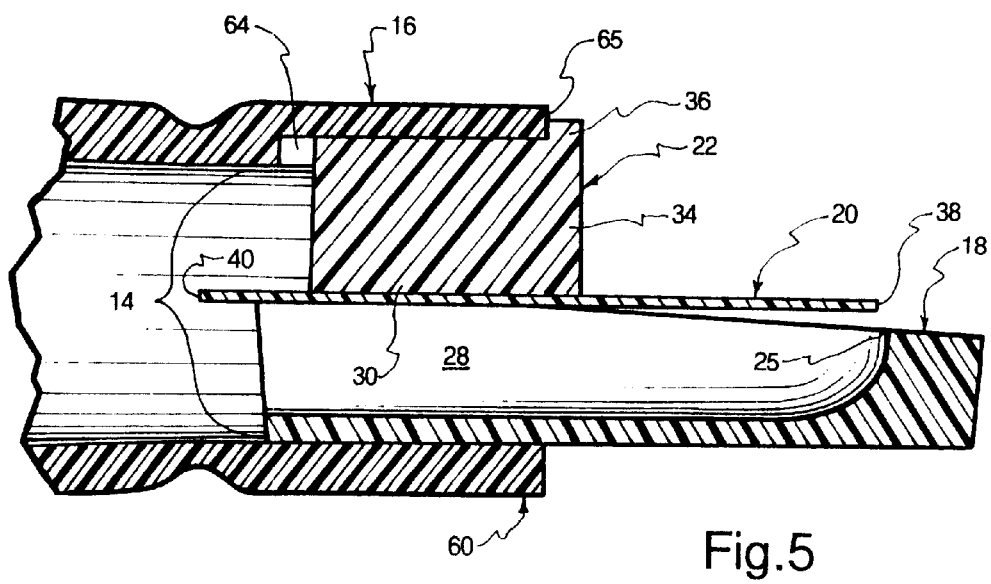
FIG. 5 is an enlarged, partial sectional side elevation view, taken along the line 5—5 of FIG. 4, of the reed assembly completely inserted into the stopper according to the game call apparatus of FIG. 1.

With reference to FIGS. 1 and 5, the reed 20 more specifically comprises a distal end 38, and a proximal end 40. Proximal end 40 includes an angled or tapered edge 42 (FIG. 1) which will allow the person assembling the game call to place the reed in the appropriate orientation (i.e., with the proper side up) relative to sounding board 18. With edge 42, the proper orientation can be achieved even in the dark by feel alone. The reed 20 further comprises cut-out locations 44 which allow the reed to be moved longitudinally relative to sounding board 18 and secured in a desired location. The cut-out locations 44 in combination with posts 50 formed on sounding board 18, provide a reed relocation system for the game call according to the present invention.

Sounding board 18 comprises a sloped top surface 52. The sounding board 18 comprises generally a U-shaped body (in cross section) which defines a main air passageway 28. The reed 20 rests on opposed top surfaces 48 which comprise top edges of the U-shaped trough or main air passageway 28. A curved bottom surface 46 extends between top surfaces 48. Posts 50 extend integrally upwardly from top surfaces 48. A sloping surface 52 slopes slightly downward relative to top surfaces 48 and extends around passageway 28. A plurality of channels or ditches 54 may be formed in top sloping surface 52. While the disclosed embodiment shows channels 54, it is to be understood that any type of variation to surface 52 (i.e., any contour or surface irregularity such as channels, ditches, protuberances, ridges, ribs, etc.) may be provided without departing from the scope of the present invention. Such surface variations or irregularities may serve to divert moisture and tune the game call. This concept, as well as the reed relocation concept, is disclosed in U.S. Pat. Nos. 5,910,039 and 6,234,895, which are incorporated in their entireties by this reference.

As mentioned, the cut-out areas 44 of reed 20 fit over posts 50 to form the reed relocation system. In one embodiment, the distal end 38 of reed 20 will line up in close approximation to an apex 25 (FIG. 5) of main air passageway 28 formed in the sounding board 18.

As shown in FIG. 2, a wedge adjustment system in the form of a pair of longitudinal slots 35 (FIG. 2) are provided the bottom surface of wedge 22. Slots 35 are configured to receive the ends of posts 50 so that the entire reed assembly 14 (i.e., the sounding board 18, the reed 20, and the wedge 22) can be assembled for insertion into the end of stopper 16. Slots 35 also allow longitudinal adjustment of the wedge 22 relative to the reed 20, while posts maintain the appropriate side-to-side or transverse orientation of the wedge 22 relative to the reed. Movement of the wedge 22 relative to the reed via wedge adjustment system allows the contact point of the wedge 22 (defined by leading edge 37 (FIG. 2) of the wedge 22) to contact the reed 20 at a different longitudinal location without changing the location of the reed 20 relative to the sounding board 18. This wedge adjustment capability (i.e., the ability to move the wedge 22 relative to the reed 20 without changing the location of the reed 20 relative to the sounding board 18) will allow the user to create different sounds and tones without changing the air flow characteristics resulting from the location of reed 20 relative to sounding board 18.

With reference to FIGS. 1 and 3–7, the stopper 16 comprises a relatively smaller end 60 into which the reed assembly 14 is inserted. The small end 60 comprises a cylindrical inside diameter surface 62 and a key slot or groove 64 which is formed longitudinally through the top wall of the stopper 16 along an axis parallel to the orthogonal axis of the stopper. The key slot 64 comprises a female portion of a keyway which limits relative rotational movement between the stopper 16 and the reed assembly 14.

Figure 4:
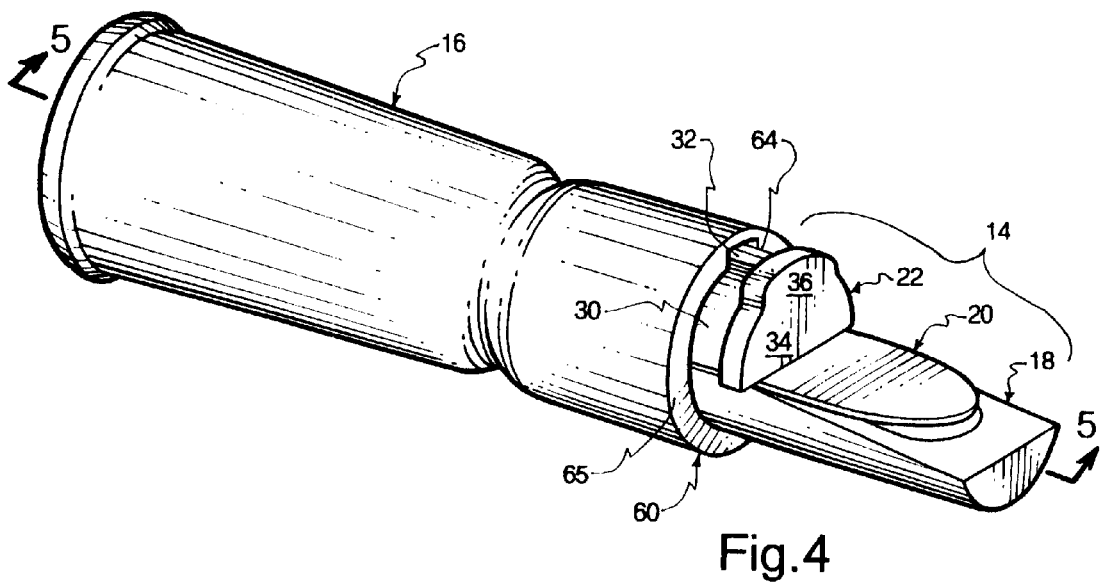
FIG. 4 is a perspective view of a reed assembly partially inserted into a stopper according to the game call apparatus of FIG. 1.

With reference to FIGS. 4 and 5, after the reed assembly 14 (which, again, comprises sounding board 18, reed 20, and wedge 22) is nested together, the reed assembly 14 is inserted into the opening formed in the narrow or proximal end 60 of the stopper 16. FIG. 4 shows the reed assembly 14 partially inserted into the end 60 of stopper 16. A key or male portion 32 formed on wedge 22 is aligned with and inserted into the slot or female portion 64 of the keyway. When inserting the reed assembly 14 into the stopper 16, the user may place his or her thumb against wall 34 and push the entire reed assembly 14 into the opening formed at end 60 of stopper 16 until wall 34 bottoms out on surface 65 (FIGS. 1 and 4) of stopper 16. In essence, the wall 34 controls or establishes the correct distance at which the reed assembly 14 should be inserted into the stopper 16 to achieve the proper pressure on the reed 20 so that proper game calls can be produced.

In operation, if necessary or desirable, the reed assembly 14 may be rotated (e.g., in a reciprocal back-and-forth manner) within the rotational range of motion allowed by the keyway (defined by key 32 and key slot 64) to assemble the game call. A similar back-and-forth reciprocal rotation of the reed assembly within the rotational range may also be utilized to disassemble the game call.

Figure 6:
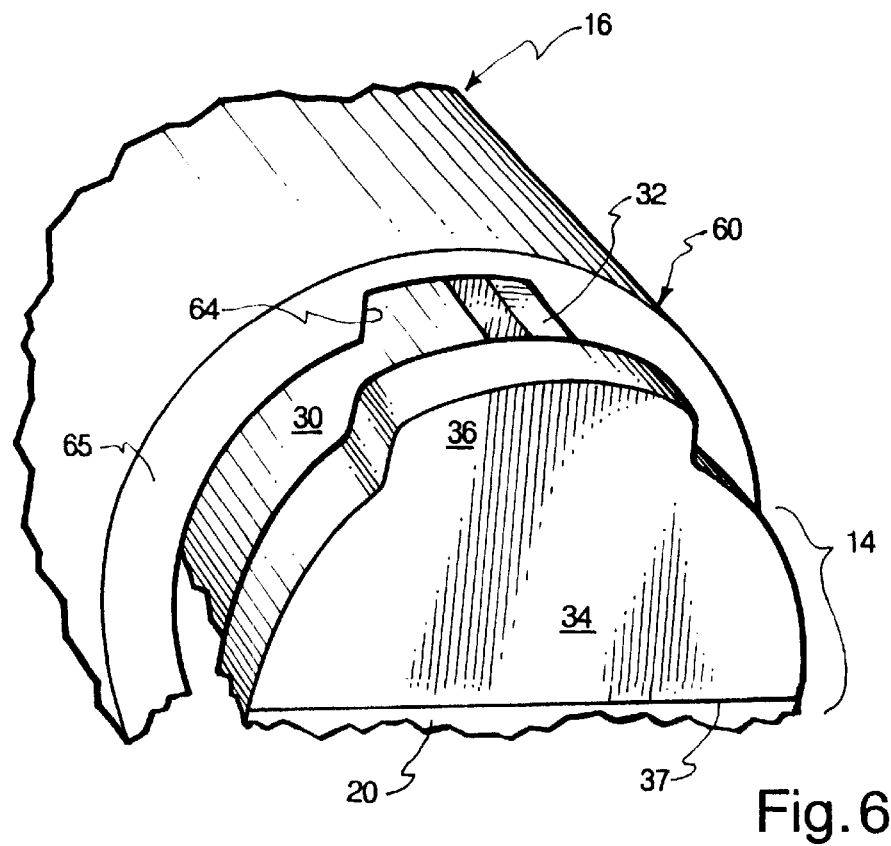
FIG. 6 is a partial perspective view of the reed assembly partially inserted into the stopper with the reed assembly rotated to an extreme angle in one direction.
Figure 7:
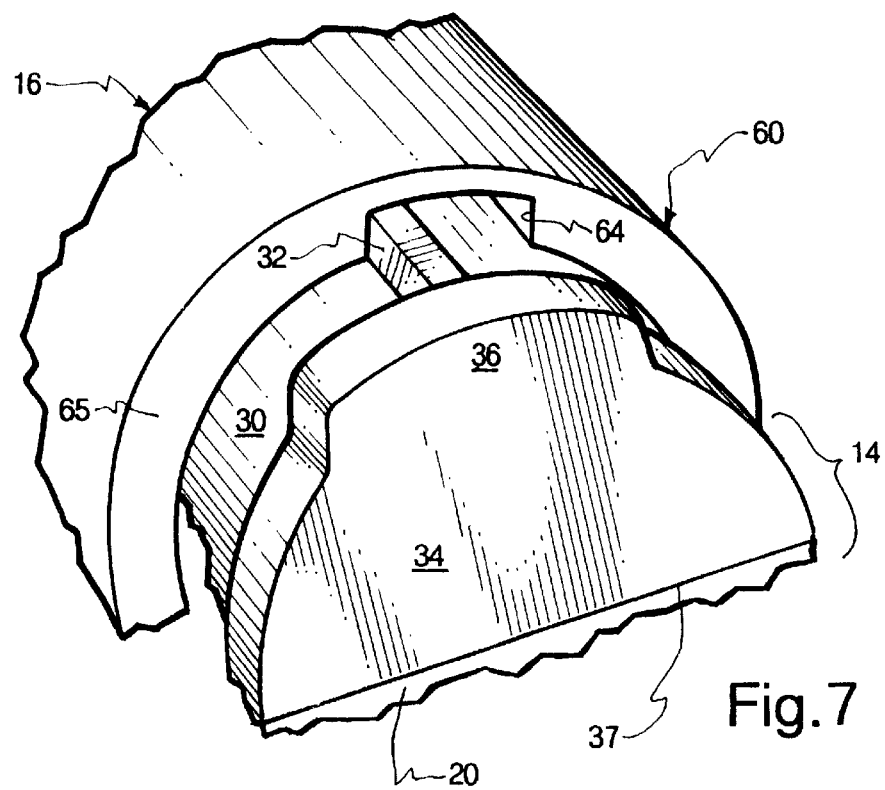
FIG. 7 is a partial perspective view of the reed assembly partially inserted into the stopper with the reed assembly rotated to an extreme angle in an opposite direction as compared to what is shown in FIG. 6.

As shown in FIGS. 6 and 7, the keyway (i.e., key 32 and key slot 64) allows a very limited range of rotational movement between reed assembly 14 and stopper 64. In one embodiment, the range of relative rotation permitted between stopper 16 and reed assembly 14 is approximately 20°. It is to be understood, however, that other ranges (both smaller and larger) of rotational movement may be permitted without departing from the scope of the present invention.

A primary benefit of the rotation restrictor (i.e., the keyway defined in one embodiment) is that the reed assembly 14 is allowed to rotate, but only in a restricted manner (i.e., within a limited rotational movement range) relative to and inside of stopper 16. By limiting the range of rotational movement, wear between the two components being fitted together is reduced and the life of the call is prolonged. The end wall 34 of the wedge 22 allows a repeatable and predictable amount of insertion of reed assembly 14 into stopper 16.

While this invention has been described with reference to certain specific embodiments and examples, it will be recognized by those skilled in the art that many variations are possible without departing from the scope and spirit of this invention. The invention, as defined by the claims, is intended to cover all changes and modifications of the invention which do not depart from the spirit of the invention. The words "including" and "having," as used in the specification, including the claims, shall have the same meaning as the word "comprising."

What is claimed is:

1. A game call assembly system, comprising:
   a reed assembly, comprising:
      a sounding board;
      a reed operatively coupled to the sounding board;
      a wedge to hold the reed in a desired position on the sounding board;
   a stopper coupled to the reed assembly to hold the sounding board, the reed, and the wedge together and hold the reed in a desired position relative to the sounding board;
   a rotation restrictor comprising a structure interposed between the reed assembly and the stopper to restriction rotation between the stopper and the reed assembly.

2. A game call assembly system according to claim 1, further comprising a barrel for securing about the stopper and the reed assembly.

3. A game call assembly system, comprising:
   a reed assembly, comprising:
      a sounding board;
      a reed operatively coupled to the sounding board;
      a wedge to hold the reed in a desired position on the sounding board;
   a stopper coupled to the reed assembly to hold the sounding board, the reed, and the wedge together and hold the reed in a desired position relative to the sounding board;
   a rotation restrictor interposed between the reed assembly and the stopper to restrict rotation between the stopper and the reed assembly;
   wherein the rotation restrictor comprises a keyway formed by a portion of the stopper and a portion of the reed assembly.

4. A game call assembly system, comprising:
   a reed assembly, comprising:
      a sounding board;
      a reed operatively coupled to the sounding board;
      a wedge to hold the reed in a desired position on the sounding board;
   a stopper coupled to the reed assembly to hold the sounding board, the reed and the wedge together and hold the Teed in a desired position relative to the sounding board;
   a rotation restrictor interposed between the reed assembly and the stopper to restrict rotation between the stopper and the reed assembly;
   wherein the rotation restrictor comprises a keyway formed by a portion of the stopper and a portion of the wedge.

5. A game call assembly system, comprising:
   a reed assembly, comprising:
      a sounding board;
      a reed operatively coupled to the sounding board;
      a wedge to hold the reed in a desired position on the sounding board;
   a stopper coupled to the reed assembly to hold the sounding board, the reed, and the wedge together and hold the reed in a desired position relative to the sounding board;
a rotation restrictor interposed between the reed assembly and the stopper to restrict rotation between the stopper and the reed assembly;
wherein the rotation restrictor comprises a keyway formed by a female portion of the stopper and a male portion of the wedge.

6. A game call assembly system, comprising:
reed assembly, comprising:
a sounding board;
a reed operatively coupled to the sounding board;
a wedge to hold the reed in a desired position on the sounding board;
a stopper coupled to the reed assembly to hold the sounding board, the reed, and the wedge together and hold the reed in a desired position relative to the sounding board;
a rotation restrictor interposed between the reed assembly and the stopper to restrict rotation between the stopper and the reed assembly;
wherein the rotation restrictor comprises a keyway formed by an elongated female channel formed in the stopper and an elongated male key formed in the wedge.

7. A game call assembly system, comprising:
a reed assembly, comprising:
a sounding board;
a reed operatively coupled to the sounding board;
a wedge to hold the reed in a desired position on the sounding board;
a stopper coupled to the reed assembly to hold the sounding board, the reed, and the wedge together and hold the reed in a desired position relative to the sounding board;
a rotation restrictor interposed between the reed assembly and the stopper to restrict rotation between the stopper and the reed assembly;
wherein the rotation restrictor comprises a key way formed by an elongated female channel formed in the stopper and an elongated key formed in the wedge allowing approximately 20° of relative rotation between the stopper and the reed assembly.

8. A game call assembly system, comprising:
a reed assembly, comprising:
a sounding board;
a reed operatively coupled to the sounding board;
a wedge to hold the reed in a desired position on the sounding board;
a stopper coupled to the reed assembly to hold the sounding board, the reed, and the wedge together and hold the reed in a desired position relative to the sounding board;
a rotation restrictor interposed between the reed assembly and the stopper to restrict rotation between the stopper and the reed assembly;
further comprising an insertion stop formed on the reed assembly to limit the extent to which the reed assembly is inserted into the stopper.

9. A game call assembly system, comprising:
a reed assembly, comprising:
a sounding board;
a reed operatively coupled to the sounding board;
a wedge to hold the reed in a desired position on the sounding board;
a stopper coupled to the reed assembly to hold the sounding board, the reed, and the wedge together and hold the reed in a desired position relative to the sounding board;
a rotation restrictor interposed between the reed assembly and the stopper to restrict rotation between the stopper and the reed assembly;
further comprising an end wall formed in the wedge, the end wall establishing a correct distance at which the reed assembly is inserted into the stopper to produce proper game call sounds.

10. A game call assembly system, comprising:
a reed assembly, comprising:
a sounding board having an air passageway;
a reed operatively coupled to the sounding board immediately adjacent the air passageway;
a stopper for securing about the reed assembly;
a rotation restrictor comprising a structure interposed between the reed assembly and the stopper to allow restrictive relative rotation between the stopper and the reed assembly.

11. A game call assembly system according to claim 10, further comprising a barrel for securing about the stopper and the reed assembly.

12. A game call assembly system, comprising:
a reed assembly, comprising:
a sounding board having an air passageway;
a reed operatively coupled to the sounding board immediately adjacent the air passageway;
a stopper for securing about the reed assembly;
a rotation restrictor interposed between the reed assembly and the stopper to allow restrictive relative rotation between the stopper and the reed assembly;
wherein the rotation restrictor comprises a keyway formed by a portion of the stopper and a portion of the reed assembly.

13. A game call assembly system, comprising:
a reed assembly, comprising:
a sounding board having an air passageway;
a reed operatively coupled to the sounding board immediately adjacent the air passageway;
a stopper for securing about the reed assembly;
a rotation restrictor interposed between the reed assembly and the stopper to allow restrictive relative rotation between the stopper and the reed assembly;
further comprising a wedge to hold the reed on the sounding board, wherein the rotation restrictor comprises a keyway formed by a portion of the stopper and a portion of the wedge.

14. A game call assembly system, comprising:
a reed assembly, comprising:
a sounding board having an air passageway,
a reed operatively coupled to the sounding board immediately adjacent the air passageway;
a stopper for securing about the reed assembly;
a rotation restrictor interposed between the reed assembly and the stopper to allow restrictive relative rotation between the stopper and the reed assembly;
further comprising a wedge to hold the reed on the sounding board, wherein the rotation restrictor comprises a keyway formed by a female portion of the stopper and a male portion of the wedge.

15. A game call assembly system, comprising:
a reed assembly, comprising:

a sounding board having an air passageway;
a reed operatively coupled to the sounding board immediately adjacent the air passageway;
a stopper for securing about the reed assembly;
a rotation restrictor interposed between the reed assembly and the stopper to allow restrictive relative rotation between the stopper and the reed assembly;
further comprising a wedge to hold the reed on the sounding board wherein the rotation restrictor comprises a keyway formed by an elongated female channel formed in the stopper and an elongated male key formed in the wedge.

16. A game call assembly system, comprising:
a reed assembly, comprising:
a sounding board having an air passageway;
a reed operatively coupled to the sounding board immediately adjacent the air passageway;
a stopper for securing about the reed assembly;
a rotation restrictor interposed between the reed assembly and the stopper to allow restrictive relative rotation between the stopper and the reed assembly;
wherein the rotation restrictor comprises a keyway formed by an elongated female channel formed in the stopper and an elongated male key formed in the wedge allowing restricted rotation of approximately 20° of relative rotation between the stopper and the reed assembly.

17. A game call assembly system, comprising:
a reed assembly, comprising:
a sounding board having an air passageway;
a reed operatively coupled to the sounding board immediately adjacent the air passageway;
a stopper for securing about the reed assembly;
a rotation restrictor interposed between the reed assembly and the stopper to allow restrictive relative rotation between the stopper and the reed assembly;
further comprising an insertion stop formed on the reed assembly to limit the extent to which the reed assembly is inserted into the stopper.

18. A game call assembly system, comprising:
a reed assembly, comprising:
a sounding board having an air passageway;
a reed operatively coupled to the sounding board immediately adjacent the air passageway;
a stopper for securing about the reed assembly;
a rotation restrictor interposed between the reed assembly and the stopper to allow restrictive relative rotation between the stopper and the reed assembly;
further comprising a wedge to hold the reed on the sounding board, and further comprising an end wall formed in the wedge the end wall establishing a correct distance at which the reed assembly is inserted into the stopper to produce proper game call sounds.

19. A game call assembly system comprising:
a reed assembly comprising:
a sounding board;
a reed operatively coupled to the sounding board;
a wedge to hold the reed in a desired position on the sounding board;
a stopper coupled to the reed assembly to hold the sounding board, the reed, and the wedge together;
a wedge adjustment system incorporated into the reed assembly, the wedge adjustment system allowing the wedge to be moved longitudinally relative to the reed without changing the orientation of the reed relative to the sounding board;
a rotation restrictor comprising a structure interposed between the reed assembly and the stopper to allow restrictive relative rotation between the stopper and the reed assembly.

20. A game call assembly system, comprising:
a reed assembly, comprising:
a sounding board;
a reed operatively coupled to the sounding board;
a wedge to hold the reed in a desired position on the sounding board;
a stopper coupled to the reed assembly to hold the sounding board, the reed, and the wedge together;
a wedge adjustment system incorporated into the reed assembly, the wedge adjustment system allowing the wedge to be moved longitudinally relative to the reed without changing the orientation of the reed relative to the sounding board;
wherein the wedge adjustment system comprises a pair of slots formed in the wedge and a pair of posts extending from the sounding board, the posts extending inside the slots to allow longitudinal adjustments of the wedge relative to the reed relative and to prevent side-to-side movement of the wedge relative to the reed.

21. A method of assembling a game call, comprising:
providing a barrel assembly, comprising:
a sounding board;
a reed operatively coupled to the sounding board;
a stopper to hold the sounding board and the reed together;
interposing a rotation restrictor comprising a structure between the stopper and the reed assembly to provide a rotational limit between the stopper and the reed assembly;
rotating the stopper and the barrel relative to each other within the rotational limit to assemble and disassemble the game call.

22. A method of assembling a game call comprising:
providing a barrel assembly, comprising:
a sounding board;
a reed operatively coupled to the sounding board,
a stopper to hold the sounding board and the reed together;
interposing a rotation restrictor between the stopper and the reed assembly to provide a rotational limit between the stopper and the reed assembly;
rotating the stopper and the barrel relative to each other within the rotational limit to assemble and disassemble the game call;
providing an insertion stop on the reed assembly to limit the extent to which the reed assembly can be inserted into the stopper;
inserting the reed assembly until the insertion stop prevents further insertion of the reed assembly into the stopper.

23. A method of assembling a game call, comprising:
providing a barrel assembly, comprising:
a sounding board;
a reed operatively coupled to the sounding board;
a stopper to hold the sounding board and the reed together;
interposing a rotation restrictor between the stopper and the reed assembly to provide a rotational limit between the stopper and the reed assembly;

rotating the stopper and the barrel relative to each other within the rotational limit to assemble and disassemble the game call;

providing a wedge;

adjusting the wedge relative to the reed without adjusting the reed relative to the sounding board.

* * * * *